US007665833B2

(12) United States Patent
Ishizawa et al.

(10) Patent No.: US 7,665,833 B2
(45) Date of Patent: Feb. 23, 2010

(54) DIFFERENTIAL PRESSURE VALVE UNIT

(75) Inventors: Taku Ishizawa, Nagano (JP); Satoshi Shinada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 543 days.

(21) Appl. No.: 11/553,537

(22) Filed: Oct. 27, 2006

(65) Prior Publication Data

US 2007/0131885 A1 Jun. 14, 2007

(30) Foreign Application Priority Data

Dec. 13, 2005 (JP) ............................. 2005-359540
Jul. 20, 2006 (JP) ............................. 2006-198555

(51) Int. Cl.
*B41J 2/175* (2006.01)
*F16K 31/00* (2006.01)

(52) U.S. Cl. ........................... 347/86; 347/85; 251/61.2

(58) Field of Classification Search ................... 347/86, 347/85, 84, 93; 137/859, 505.42, 505.39, 137/496, 854, 843; 251/354, 44, 61.2, 358
See application file for complete search history.

(56) References Cited

U.S. PATENT DOCUMENTS 6,550,901 B2 * 4/2003 Iida ............................. 347/86
6,585,358 B2 * 7/2003 Usui et al. ..................... 347/85
7,090,341 B1 * 8/2006 Miyazawa ................... 347/85
7,097,293 B2 * 8/2006 Ichihashi et al. .............. 347/86
2001/0006396 A1 7/2001 Iida

FOREIGN PATENT DOCUMENTS

EP 1 016 533 A1 7/2000
EP 1 428 664 A1 6/2004
JP 2004-237720 A 8/2004

OTHER PUBLICATIONS

Extended European Search Report for European patent appln. No. 06126010.5 (Apr. 19, 2007).

* cited by examiner

*Primary Examiner*—Stephen D Meier
*Assistant Examiner*—Rene Garcia, Jr.
(74) *Attorney, Agent, or Firm*—Stroock & Stroock & Lavan LLP

(57) ABSTRACT

A differential pressure valve unit that is accommodated in a liquid cartridge main body having: a liquid containing portion containing liquid; and a liquid supply portion supplying the liquid in the liquid containing portion to the outside, the differential pressure value unit including: a membrane valve that is opened when a predetermined pressure difference between the liquid containing portion and the liquid supply portion occurs; and a first member that holds the membrane valve and forms a downstream pressure chamber together with the membrane valve, wherein, in the first member, an opposing surface forming the downstream pressure chamber and having a connection port connected to the liquid supply portion has a shape corresponding to a movable range of the membrane valve, and a groove portion is provided at the opposing surface in order to allow the liquid in the downstream pressure chamber to easily flow into the connection port.

17 Claims, 9 Drawing Sheets

DIFFERENTIAL PRESSURE VALVE UNIT

BACKGROUND

1. Technical Field

The present invention relates to a differential pressure valve unit that is accommodated in a liquid cartridge main body. In particular, the present invention relates to a structure of a differential pressure valve unit that is mounted to an ink cartridge used for an ink jet recording apparatus.

2. Related Art

In an ink jet recording apparatus, an ink cartridge that contains ink is mounted on a holder of the ink jet recording apparatus, and ink is supplied to a recording head.

In such an ink cartridge, a differential pressure valve unit having a valve member that is opened when a predetermined pressure difference between an ink containing portion containing ink and an ink supply portion supplying ink occurs is attached to the ink cartridge. Moreover, the ink cartridge described herein is an example of a liquid cartridge.

For example, a differential pressure valve unit described in Patent Document 1 has a valve member that can be elastically deformed on the basis of a pressure difference and has a cylindrical edge portion, a valve lid that has a valve member holding portion, substantially having a cylindrical shape, inserted into the edge portion of the valve member to fix the edge portion, and an urging member that is interposed between the valve member and the valve lid and urges the valve member in a direction away from the valve lid.

Patent Document 1: JP-A-2004-237720

In the above-described differential pressure valve unit of the ink cartridge, since the differential pressure valve does not normally operate when a downstream pressure chamber between a membrane valve serving as the valve member and the valve lid is empty, an ink end may be judged in a state where ink remains in the downstream pressure chamber. In a known differential pressure valve unit, a space of the downstream pressure chamber is comparatively large and, when the ink end is judged, a large amount of ink remains in the downstream pressure chamber.

In order to solve this problem, a method that makes the space of the downstream pressure chamber between the membrane valve and the valve lid small is considered. However, when the space of the downstream pressure chamber is made small, the flow of the liquid when the liquid is discharged from the chamber deteriorates, and thus responsibility to a pressure applied to the differential pressure valve unit may be degraded.

SUMMARY

An advantage of some aspects of the invention is to provide a differential pressure valve unit that can reduce the amount of a liquid remaining in a downstream pressure chamber of a differential pressure valve of a liquid cartridge and improve responsibility to a pressure applied to a differential pressure valve unit, and a liquid cartridge having such a differential pressure valve unit.

According to an aspect of the invention, there is provided a differential pressure valve unit that is accommodated in a liquid cartridge main body having: a liquid containing portion containing liquid; and a liquid supply portion supplying a liquid in the liquid containing portion to the outside. The differential pressure valve unit includes a membrane valve that is opened when a predetermined pressure difference between the liquid containing portion and the liquid supply portion occurs, and a first member that holds the membrane valve and forms a downstream pressure chamber together with the membrane valve. In the first member, an opposing surface forming the downstream pressure chamber and having a connection port connected to the liquid supply portion has a shape corresponding to a movable range of the membrane valve. A groove portion is provided at the opposing surface in order to allow the liquid in the downstream pressure chamber to easily flow into the connection port.

According to this configuration, when the membrane valve is opened, even though the membrane valve is deformed due to a pressure applied thereto, the interference with the first member does not occur. For this reason, the volume in the membrane valve is reduced, without obstructing the movement of the membrane valve, and thus the liquid residual quantity can be reduced. Further, a flow passage of the liquid can be secured by the groove portion, and the liquid may flow into the connection port connected to the liquid supply portion along the groove portion. Therefore, responsibility of opening/closing to the pressure of the membrane valve can be improved.

The groove portion may be provided such that an extension line of a center line thereof crosses the connection port.

According to this configuration, the liquid smoothly flows into the connection port through the groove portion.

The groove portion may be provided so as to cross the connection port.

According to this configuration, the liquid further smoothly flows from the groove portion into the connection port.

The first member may be substantially formed in a disc shape, and the groove portion may be provided along a diameter direction of the opposing surface.

According to this configuration, in the first member formed in approximately a disc shape, the liquid smoothly flows in a diameter direction of the first member. Therefore, the liquid that is distant from the connection port can be smoothly discharged.

The groove portion may be substantially provided in a linear shape.

According to this configuration, since the groove portion becomes a linear flow passage, the travel distance of the liquid toward the connection port is comparatively short.

The groove portion may be substantially provided in a ring shape.

According to this configuration, the liquid can smoothly flow over a comparatively wide range of the opposing surface.

A plurality of groove portions may be provided.

According to this configuration, a plurality of flow passages of the liquid can be secured by the plurality of groove portions. Therefore, the liquid can smoothly flow over a comparatively wide range of the opposing surface.

The shape corresponding to the movable range of the membrane valve may be a mortar shape having a deep central portion and a shallow peripheral portion.

According to this configuration, in a state where the membrane valve is opened, when the membrane valve is deformed due to the pressure applied thereto, and the central portion thereof is dented deep and the peripheral portion thereof is dented shallow, the interference with the opposing surface of the first member does not occur. Then, the volume in the membrane valve is reduced, without obstructing the movement of the membrane valve, and thus the ink residual quantity can be reduced.

The differential pressure valve unit according to the aspect of the invention may further include an urging member that is interposed between the membrane valve and the first member and urges the membrane valve in a direction in which the valve is closed.

According to this configuration, a load can be stabilized by an urging force from the urging member, the opening/closing operation of the differential pressure valve can be reliably performed, and accuracy of the pressure to be generated can be improved.

The first member may be a valve lid.

According to this configuration, when the membrane valve is opened, even though the membrane valve is deformed due to a pressure applied thereto, the interference with the first member does not occur. For this reason, the volume in the membrane valve is reduced, without obstructing the movement of the membrane valve, and thus the liquid residual quantity can be reduced.

The liquid cartridge may be an ink cartridge. Then, it is possible to obtain an ink cartridge having a small liquid residual quantity that is used in an ink jet recording apparatus. Then, in an ink injection process into the ink cartridge, ink is easily filled into the differential pressure valve.

According to the invention, since the shape of the opposing surface that forms the downstream pressure chamber of the first member corresponds to the movable range of the membrane valve, the amount of the liquid remaining in the downstream pressure chamber can be reduced. Further, since the groove portion is provided at the opposing surface in order to allow the liquid to easily flow into the connection port, the liquid in the downstream pressure chamber easily flows through the connection port, and thus responsibility to the pressure of the differential pressure valve unit can be improved.

In addition, with the liquid cartridge having the above-described differential pressure valve unit, for example, an ink cartridge having a small liquid residual quantity that is used in an ink jet recording apparatus can be obtained. Then, in an ink injection process into the ink cartridge, ink is easily filled into the differential pressure valve.

The present disclosure relates to the subject matter contained in Japanese patent application Nos. 2005-359540 filed on Dec. 13, 2005 and 2006-198555 filed on Jul. 20, 2006, which are expressly incorporated herein by reference in its entirety.

BRIEF DESCRIPTION OF THE DRAWINGS

FIG. 5A is a cross-sectional view showing a state where the valve of the differential pressure valve unit is closed and FIG. 5B is a cross-sectional view showing a state where the valve of the differential pressure valve unit is opened.

DESCRIPTION OF EXEMPLARY EMBODIMENTS

Hereinafter, a differential pressure valve unit of each of embodiments of the invention will be described in detail with reference to the drawings.

First Embodiment

In this embodiment, a valve lid of a differential pressure valve unit is used as a first member.

Figure 1:
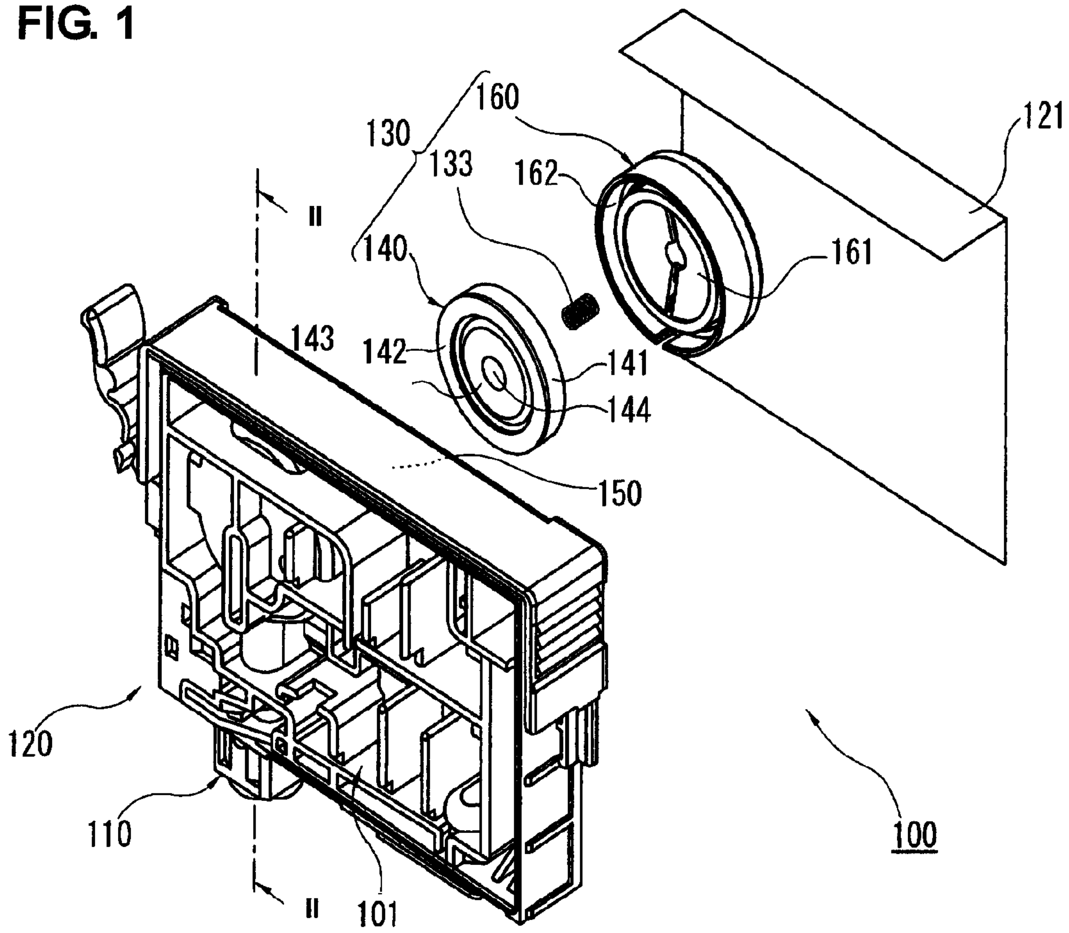
FIG. 1 is an exploded perspective view of an ink cartridge including a differential pressure valve unit according to a first embodiment of the invention.
Figure 2:
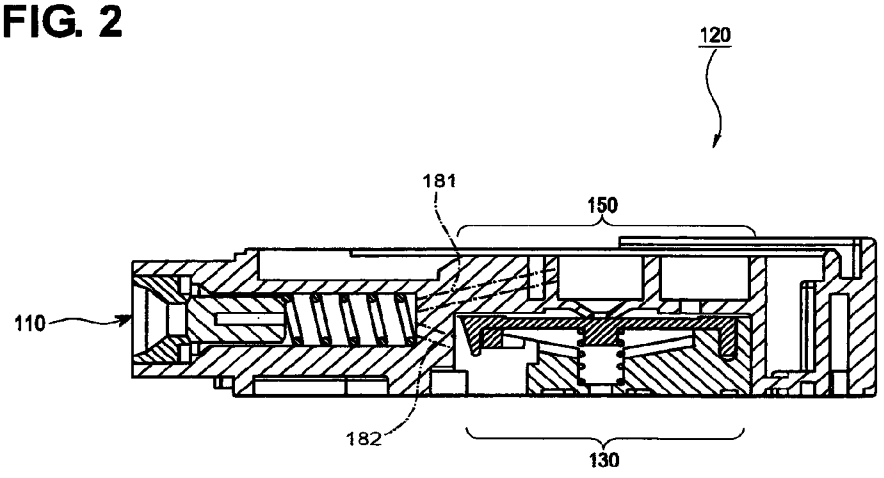
FIG. 2 is a cross-sectional view of the ink cartridge shown in FIG. 1 taken along the line II-II.
Figure 3:
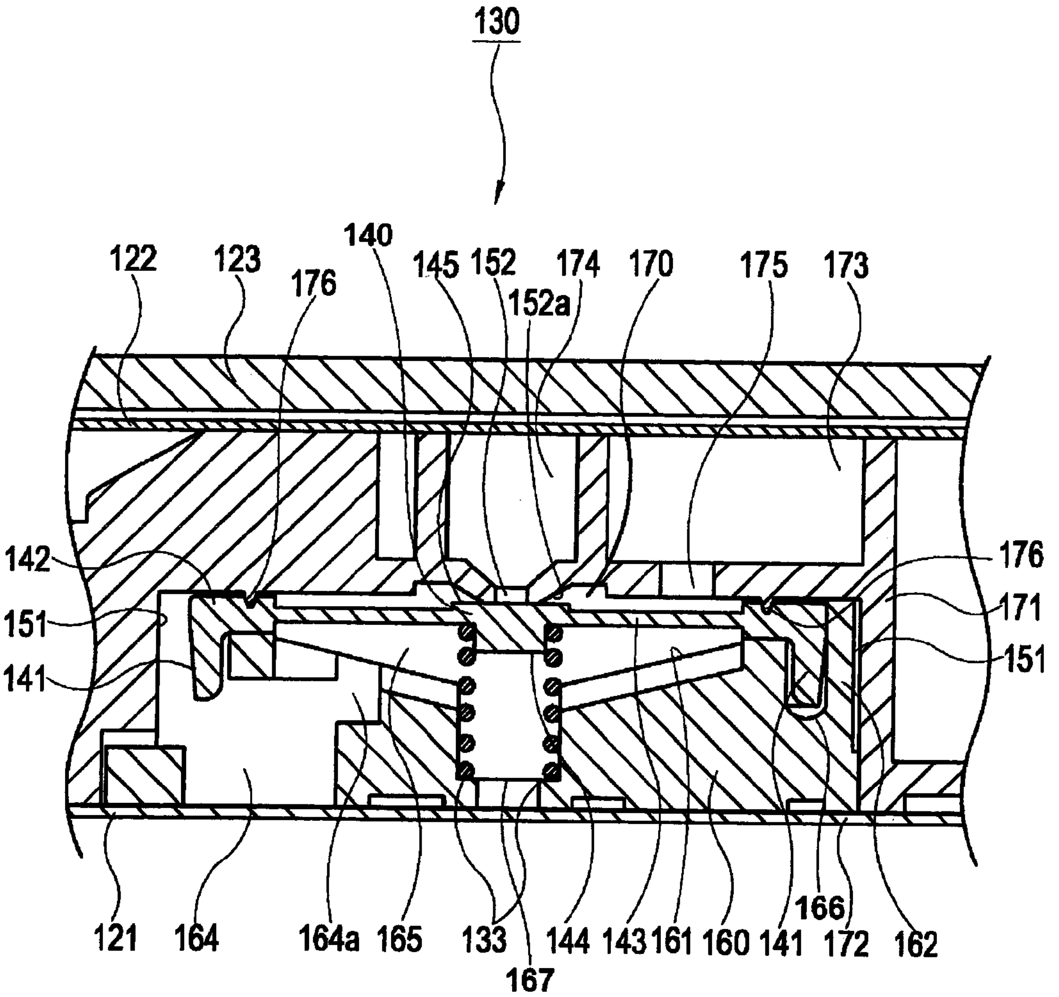
FIG. 3 is an enlarged cross-sectional view of the differential pressure valve unit shown in FIG. 2.
Figure 4:
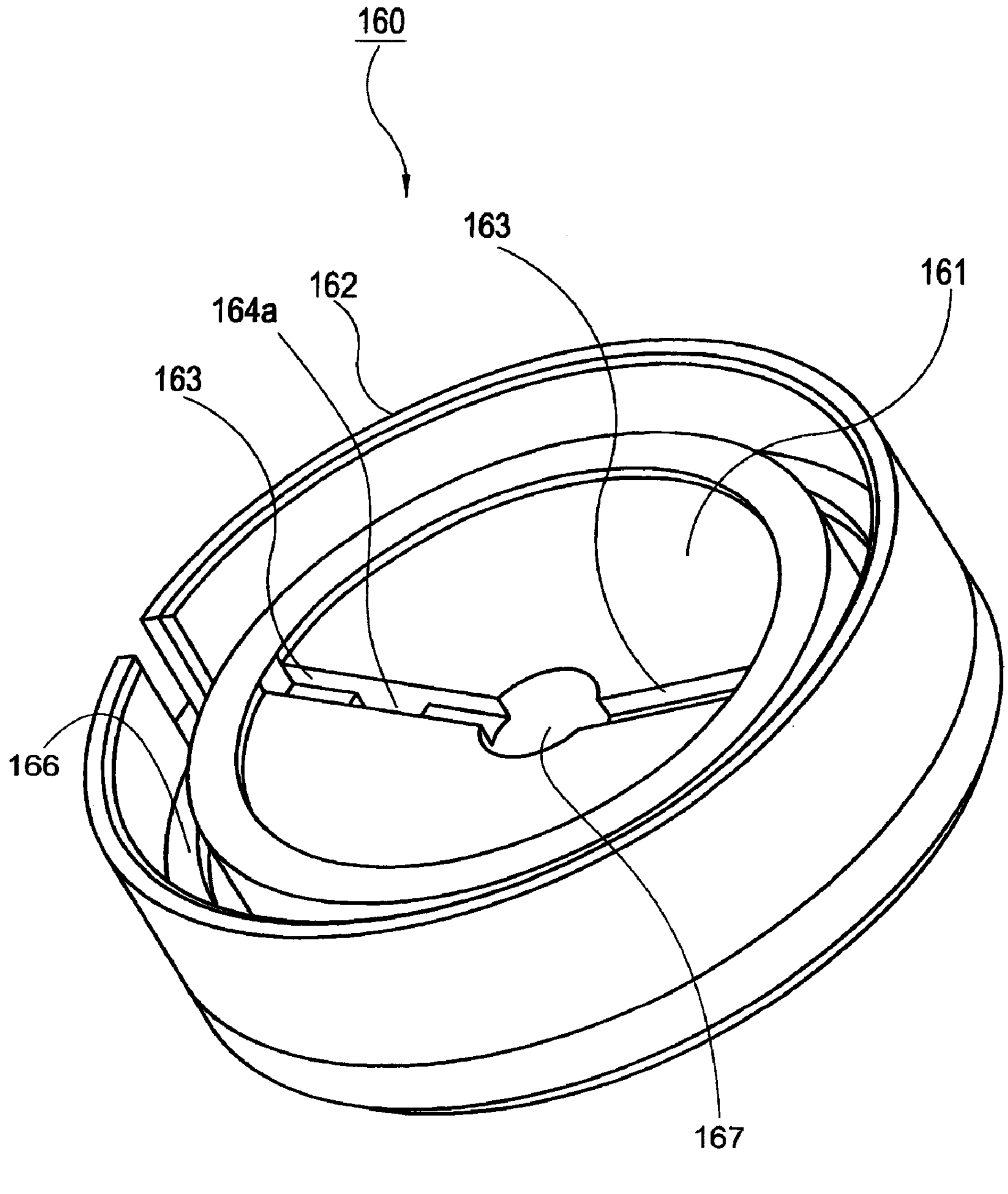
FIG. 4 is a perspective view showing a valve lid of the differential pressure valve unit shown in FIG. 3.

FIG. 1 is an exploded perspective view of an ink cartridge including a differential pressure valve unit according to a first embodiment of the invention. FIG. 2 is a cross-sectional view of the ink cartridge shown in FIG. 1 taken along the line II-II. FIG. 3 is an enlarged cross-sectional view of the differential pressure valve unit shown in FIG. 2. FIG. 4 is a perspective view showing a valve lid of the differential pressure valve unit.

As shown in FIG. 1, an ink cartridge main body (liquid cartridge main body) 120 of an ink cartridge 100 includes therein an ink containing portion (liquid containing portion) 101 that is partitioned by a rib or a wall and contains ink, an ink flow passage that extends from the ink containing portion 101 to an ink supply portion (liquid supply portion) 110, and an air connection portion that has an ink-side path, an air valve accommodating portion, and an air-side path for connecting the ink containing portion 101 to the air. The ink cartridge 100 further includes a differential pressure valve unit 130 serving as an ink supply control unit.

The ink supply portion 110 is disposed at a lower surface of the ink cartridge 100. An ink supply needle of a holder, on which the ink cartridge 100 is mounted, is inserted into the ink supply portion 110, such that ink contained in the ink containing portion 101 is supplied to a recording head of an ink jet recording apparatus.

The differential pressure valve unit 130 serving as an ink supply control unit supplies ink of the ink containing portion 101 to the ink supply portion 110 by a pressure difference between the ink containing portion 101 and the ink supply portion 110 generated as ink consumes.

The differential pressure valve unit 130 has a membrane valve 140 that can be elastically deformed and is inserted into a differential pressure valve unit accommodating portion 150, a valve lid 160 that covers the differential pressure valve unit accommodating portion 150, and a coil spring 133 serving as an urging member that is interposed between the membrane valve 140 and the valve lid 160.

As shown in FIG. 3, the membrane valve 140 of the differential pressure valve unit 130 has an edge portion 141 that substantially has a cylindrical shape, a thick portion 142 that is disposed in the vicinity of the edge portion 141, a main body portion 143 that is surrounded by the thick portion 142 and is elastically deformed, a valve lid-side protruded portion

144 that protrudes toward the valve lid 160 at the center of the main body portion 143, that is, at a position where the coil spring 133 comes into contact with the main body portion 143, and a main body-side protruded portion 145 that protrudes toward a through hole 152 at a wall surface 151 of the differential pressure valve unit accommodating portion 150.

The membrane valve 140 is formed of an elastic material more flexible than the ink cartridge main body 120, for example, elastomer. The valve lid-side protruded portion 144 substantially has a cylindrical shape, and the outer diameter of its section is slightly larger than the inner diameter of the coil spring 133 before the valve lid-side protruded portion 144 is attached to the coil spring 133. Accordingly, when the valve lid-side protruded portion 144 is inserted into one end of the coil spring 133, the coil spring 133 is accurately positioned and held with respect to the membrane valve 140.

As shown in FIG. 4, the valve lid 160 of the differential pressure valve unit 130 has a recess portion 166 that holds the edge portion 141 of the membrane valve 140, a spring receiving portion 167 that substantially has a cylindrical shape and holds the coil spring 133, and a wall surface contact portion 162 that substantially has a cylindrical shape and has is disposed in the vicinity of the valve lid 160.

An opposing surface 161 of the valve lid 160 to the membrane valve 140 has a shape corresponding to a movable range of the membrane valve, that is, a mortar shape. Accordingly, the interference with the valve lid 160 does not occur even though the membrane valve 140 is deformed due to a pressure applied thereto.

A connection port 164*a* that is connected to a connection portion 164 described below is provided at the opposing surface 161. Since the spring receiving portion 167 is formed at a central portion of the opposing surface 161, the connection port 164*a* is provided at a position distant from the central portion. Two groove portions 163 are provided along a diameter direction of the opposing surface 161 in order to allows a liquid to easily flow into the connection port 164*a*. One of the two groove portions 163 is provided to cross the connection port 164*a*.

The valve lid 160 substantially has a cylindrical shape, and its outer diameter is slightly larger than the inner diameter of the edge portion 141 of the membrane valve 140 before the edge portion 141 of the membrane valve 140 is attached.

The inner diameter of the wall surface contact portion 162 in the valve lid 160 is larger than the outer diameter of the edge portion 141 of the membrane valve 140. Accordingly, when the edge portion 141 of the membrane valve 140 is inserted into the recess portion 166 in a state where the coil spring 133 is interposed between the valve lid 160 and the membrane valve 140, the valve lid 160 urges the edge portion 141 in a direction spreading the edge portion 141 from the inside, and then the membrane valve 140 is held in the valve lid 160.

Moreover, before the edge portion 141 of the membrane valve 140 is assembled into the valve lid 160, only a part of the outer diameter of the valve lid 160 may be larger than the inner diameter of the edge portion 141, and other parts may be smaller than the inner diameter of the edge portion 141.

The valve lid 160 has a connection portion 164 that passes through from a side where the membrane valve 140 is attached and to a side where an outer film 121 is adhered.

Accordingly, when the valve lid 160 is attached to the ink cartridge main body 120, together with the membrane valve 140, a downstream pressure chamber 165 that is defined by the valve lid 160 and the membrane valve 140 is connected to the ink supply portion 110 through the connection portion 164.

Moreover, the connection portion 164 is also connected to a downstream ink supply hole 174 that is disposed immediately on a downstream side of the through hole 152.

As viewed from the differential pressure valve unit accommodating portion 150, a circular ring-shaped protrusion 176 is provided at the wall surface 151 of the differential pressure valve unit accommodating portion 150 along an outer circumference surrounding the through holes 152 and 175.

The ring-shaped protrusion 176 protrudes in a direction in which the membrane valve 140 is attached. In the section shown in FIG. 3, the ring-shaped protrusion 176 has a wedge shape tapered in the direction in which the membrane valve 140 is attached.

Since the thick portion 142 of the membrane valve 140 is more flexible than the ring-shaped portion 176, when the differential pressure valve unit is inserted into the differential pressure valve unit accommodating portion 150 from a side close to the wall surface 151 of the differential pressure valve unit accommodating portion 150 in an order of the membrane valve 140 and the valve lid 160, the front end of the ring-shaped protrusion 176 is pressed into contact with and wedged into the thick portion 142 of the membrane valve 140.

Accordingly, an upstream pressure chamber 170 that is connected to the through hole 175 is defined by the wall surface 151, the ring-shaped protrusion 176, and the membrane valve 140.

The ring-shaped protrusion 176 is disposed to face the valve lid 160 with the thick portion 142 of the membrane valve 140 interposed therebetween. Accordingly, the valve lid 160 is brought into contact with the thick portion 142 and presses the thick portion 142 against the ring-shaped protrusion 176. The membrane valve 140 can reliably seal the vicinity of the upstream pressure chamber 170.

An inner circumferential wall 171 that forms the differential pressure valve unit accommodating portion 150 and the outer circumference of the wall surface contact portion 162 of the valve lid 160 substantially the same shape.

Further, a distance between the valve lid 160 and the wall surface 151 when the wall surface contact portion 162 of the valve lid 160 is brought into contact with the wall surface 151 is slightly smaller than the sum of the height from the wall surface 151 to the front end of the ring-shaped protrusion 176 and the thickness of the thick portion of the membrane valve 140.

Accordingly, an outer surface 172 of the valve lid 160 slightly protrudes from a wall surface of the ink cartridge main body 120 in the vicinity of the valve lid 160.

The outer film 121 is attached to cover the outer surface 172 of the valve lid 160 and the wall surface of the ink cartridge main body 120 and to urge the outer surface of the valve lid 160.

Accordingly, the outer film 121 urges the valve lid 160 toward the differential pressure valve unit accommodating portion 150. Then, the valve lid 160 is further reliably attached to the differential pressure valve unit accommodating portion 150, and thus sealing performance of the ring-shaped protrusion 176 and the membrane valve 140 can be increased.

In the vicinity of the through hole 152 of the ink cartridge main body 120, a through hole protruded portion 152*a* is provided to protrude toward the membrane valve 140 and to come into contact with the main body-side protruded portion 145 of the membrane valve 140.

Accordingly, when ink is not supplied, the main body-side protruded portion 145 of the membrane valve 140 comes into contact with the through hole protruded portion 152*a*, such that the through hole 152 can be reliably blocked.

The upstream pressure chamber 170 is connected to an upstream ink tank 173 through the through hole 175, and ink is supplied from the upstream ink tank 173 to the differential pressure valve unit 130.

As described above, the membrane valve 140 and the coil spring 133 are held in the valve lid 160 and form the differential pressure valve unit 130.

Figure 5A:
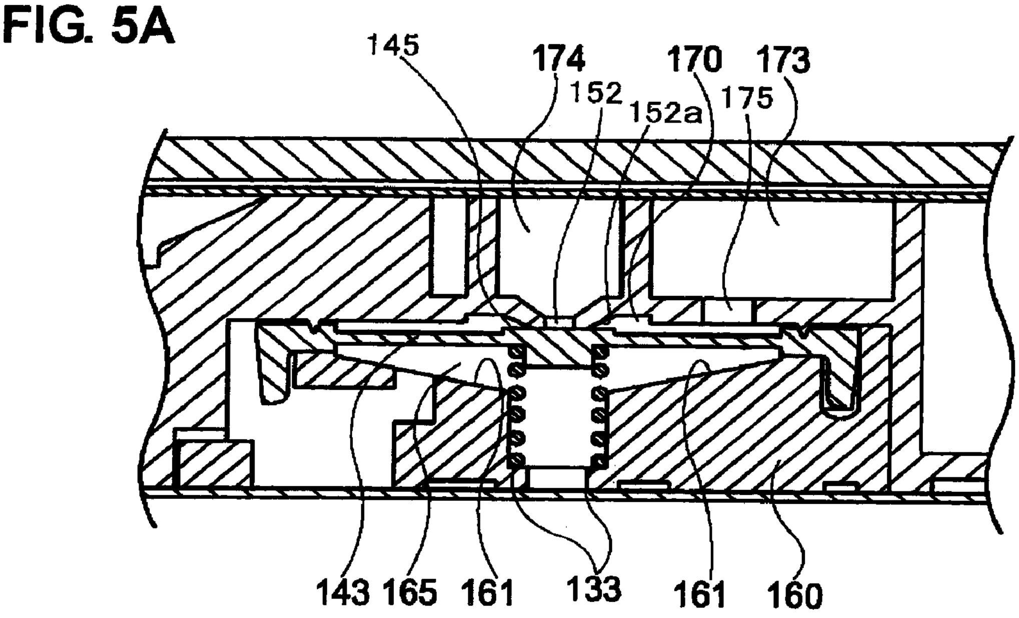
FIGS. 5A and 5B are diagrams illustrating closed and opened states of a valve of the differential pressure valve unit according to the first embodiment of the invention, respectively, and specifically.
Figure 5B:
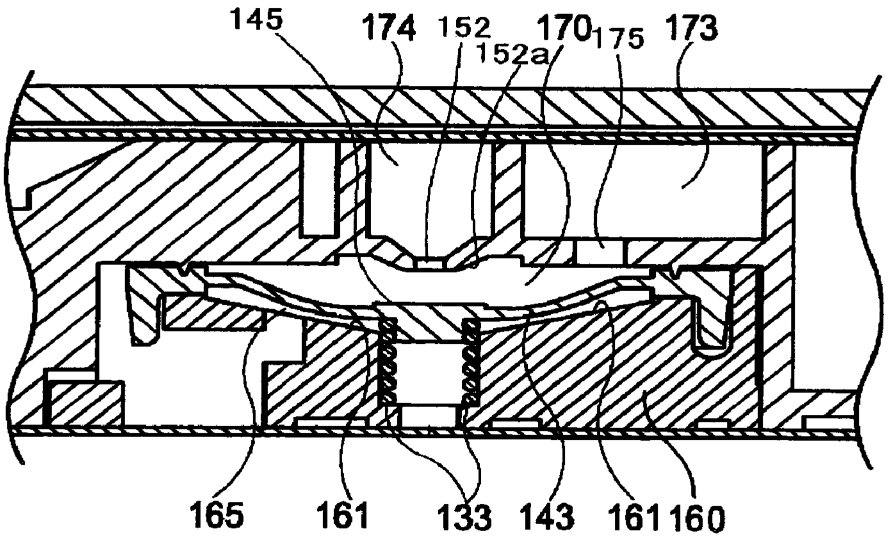

FIGS. 5A and 5B are diagrams illustrating closed and opened states of the valve of the differential pressure valve unit 130, respectively. Specifically, FIG. 5A is a cross-sectional view showing a state where the valve of the differential pressure valve unit 130 is closed, and FIG. 5B is a cross-sectional view showing a state where the valve of the differential pressure valve unit 130 is opened.

As shown in FIG. 5A, in a state where the valve is closed, the main body-side protruded portion 145 of the membrane valve 140 comes into contact with the through hold protruded portion 152*a* of the through hole 152 by an urging force of the coil spring 133 and closes the through hole 152. Accordingly, ink of the ink containing portion 101 is blocked so as not to flow out to the ink supply portion 110.

When ink consumes from the ink supply portion 110 by the recording head of the ink jet recording apparatus on which the ink cartridge 100 is mounted, the pressure of ink in the ink supply portion 110 is lowered, and then the pressure of the downstream pressure chamber 165 is lowered through connection portions 181 and 182 schematically shown in FIG. 2.

Meanwhile, at a surface of the membrane valve 140 close to the upstream pressure chamber 170, the pressure in the vicinity of the through hole 152 is lowered through the downstream ink supply hole 174, but the pressure in the vicinity of the through hole 175 is not lowered.

Accordingly, when a force according to the pressure difference between both surfaces of the membrane valve 140 is made larger than the urging force applied to the membrane valve 140 by the coil spring 133, as shown in FIG. 5B, the main body-side protruded portion 145 of the membrane valve 140 is away from the through hole protruded portion 152*a*, and thus the through hole 152 is opened.

Therefore, ink flows in an order of the upstream ink tank 173, the through hole 175, the upstream pressure chamber 170, and the downstream ink supply hole 174, and then is supplied from the ink supply portion 110 to the recording head.

As shown in FIG. 5B, in a state where the valve is opened, ink is supplied to the downstream pressure chamber 165 and the ink supply portion 110 through the downstream ink supply hole 174, and thus the pressure difference between the downstream pressure chamber 165 and the upstream ink tank 173 is released. Accordingly, the membrane valve 140 is pressed back by the urging force of the coil spring 133 and the main body-side protruded portion 145 of the membrane valve 140 closes the through hole 152. Then, the through hole 152 is blocked from the upstream pressure chamber 170. With the repetition of the above-described operation, ink contained in the ink containing portion 101 is supplied to the ink jet recording apparatus.

In this embodiment, the opposing surface 161 of the valve lid 160 to the membrane valve 140 has a shape corresponding to the movable range of the membrane valve, that is, a mortar shape. Then, as shown in FIG. 5B, in a state where the valve is opened, even though the membrane valve 140 is deformed due to the pressure applied thereto, the interference with the valve lid 160 does not occur. For this reason, the volume in the membrane valve is reduced, without obstructing the movement of the membrane valve 140, and thus the ink residual quantity can be reduced. Further, if the volume in the differential pressure valve is reduced, in an ink injection process, ink is easily filled into the differential pressure valve.

At the opposing surface 161 of the valve lid 160 to the membrane valve 140, the groove portions 163 are provided to allow the liquid to easily flow into the connection port 164*a*. Accordingly, the flow passage of ink that goes toward the connection port 164*a* can be secured by the groove portions 163. That is, the liquid that is distant from the connection port 164*a* can be smoothly discharged through the flow passage defined by the groove portions 163, and thus responsibility to the pressure by opening/closing of the membrane valve 140 can be improved.

Second Embodiment

Figure 6:
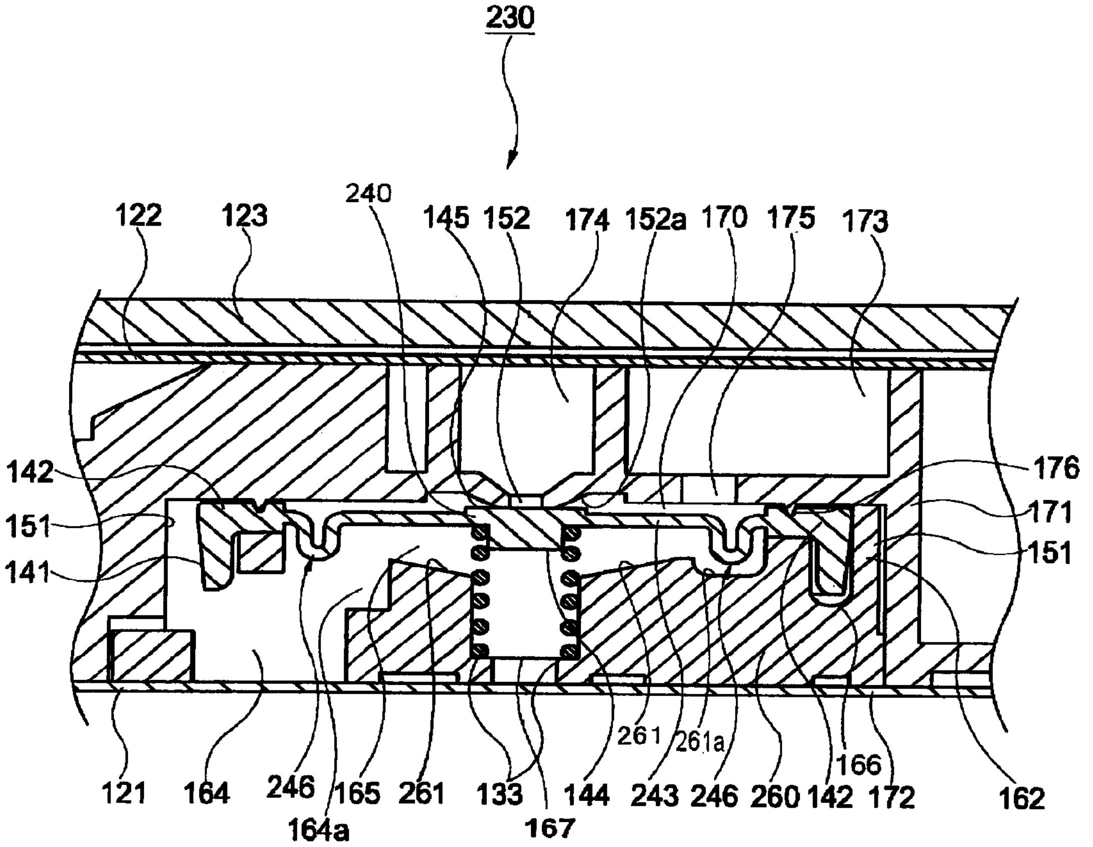
FIG. 6 is an enlarged cross-sectional view of a differential pressure valve unit according to a second embodiment of the invention.

FIG. 6 is an enlarged cross-sectional view of a differential pressure valve unit according to a second embodiment of the invention.

A differential pressure valve unit 230 according to the second embodiment is different from the differential pressure valve unit 130 according to the first embodiment in that a membrane valve 240 has an approximately U-shaped bent portion 246, as shown in FIG. 6. Further, at an opposing surface 261 of the valve lid 260 to the membrane valve 240, a recess portion 261*a* corresponding to the bent portion 246 is provided.

Other parts are the same as those in the first embodiment. The same parts are represented by the same reference numerals, and the descriptions thereof will be omitted. This embodiment has the same advantages as the first embodiment.

Next, modifications of the differential pressure valve units 130 and 230 according to the first and second embodiments of the invention will be described.

Figure 7:
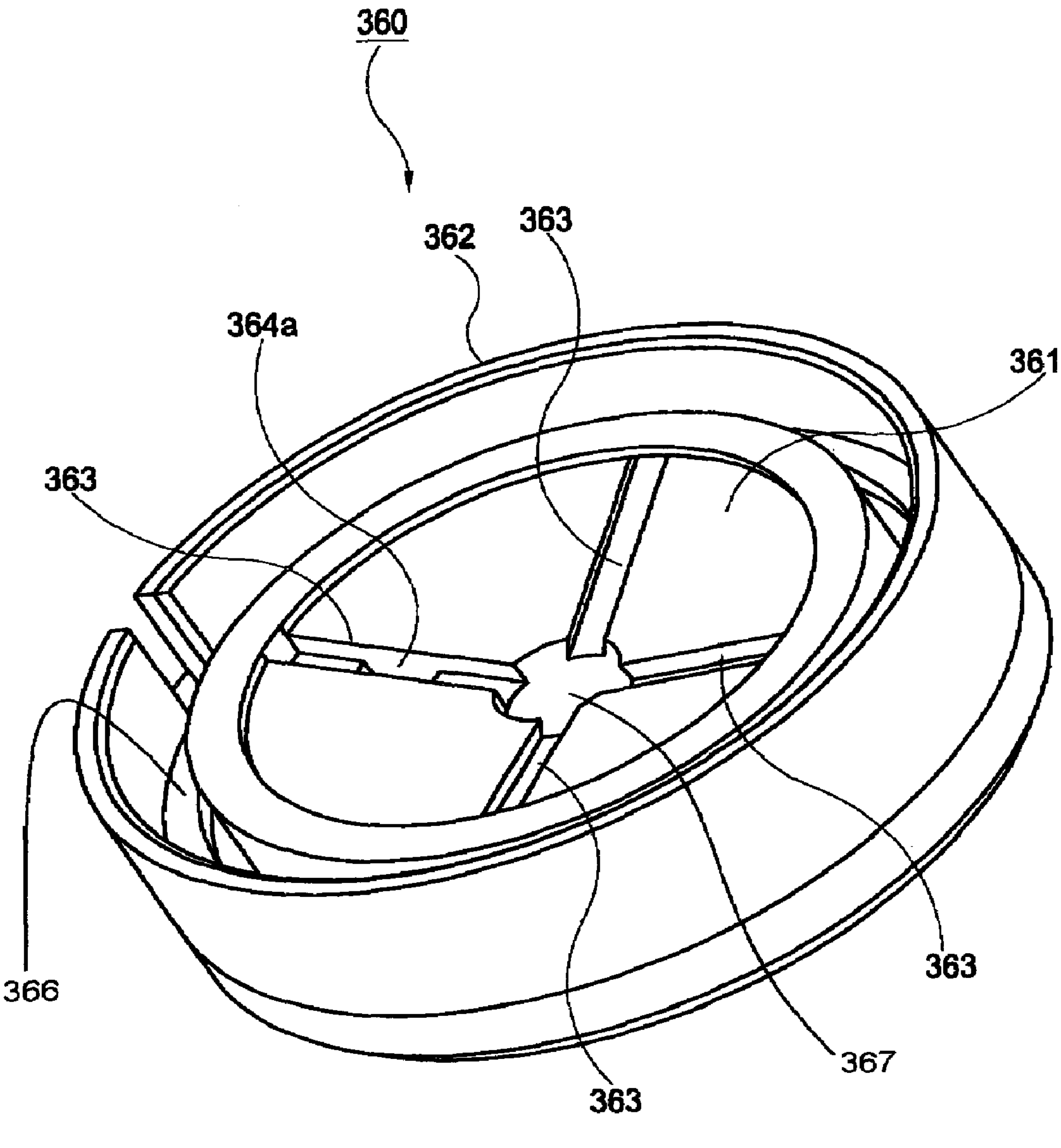
FIG. 7 is a perspective view of a first modification of the valve lid of the differential pressure valve unit according to the first or second embodiment of the invention.
Figure 8:
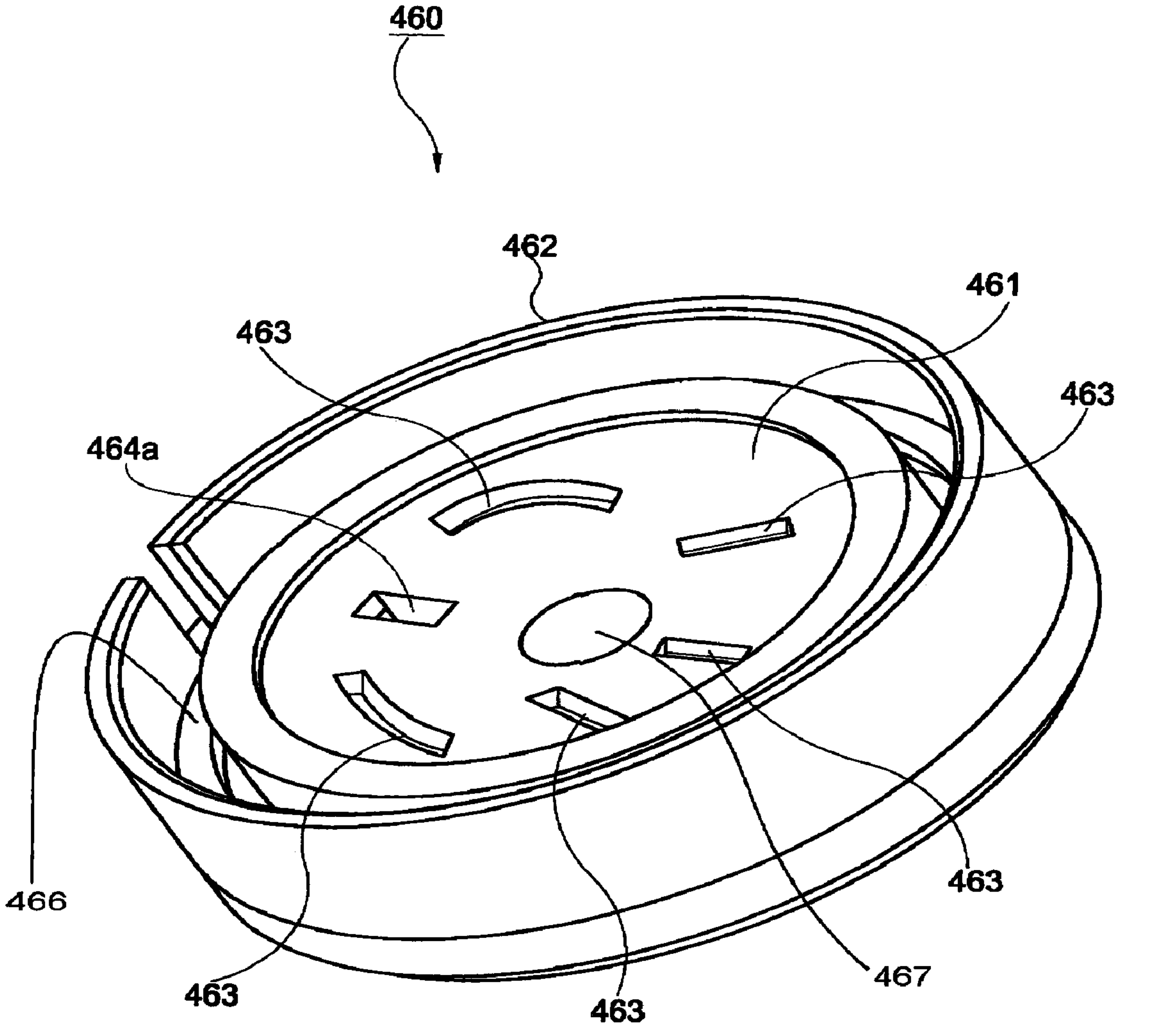
FIG. 8 is a perspective view of a second modification of the valve lid of the differential pressure valve unit according to the first or second embodiment of the invention.
Figure 9:
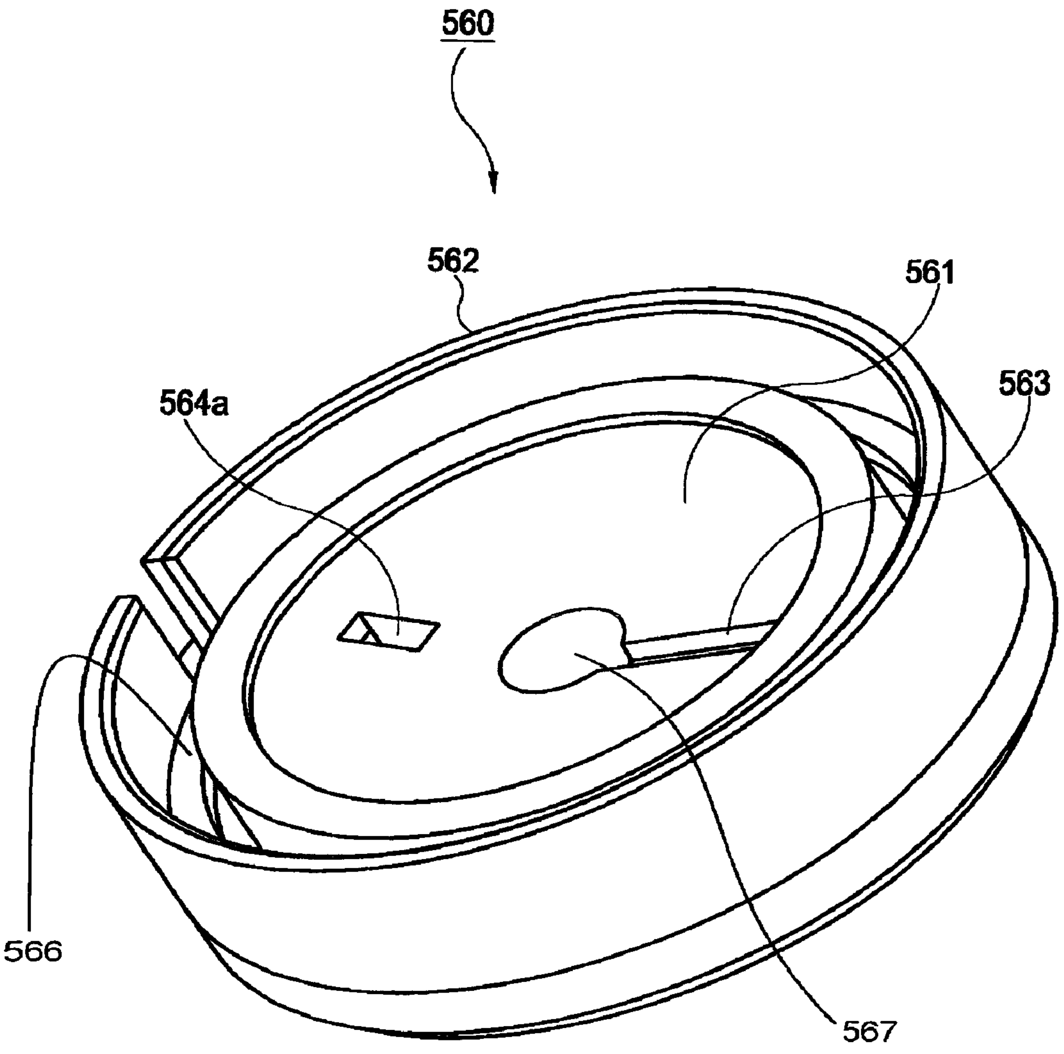
FIG. 9 is a perspective view of a third modification of the valve lid of the differential pressure valve unit according to the first or second embodiment of the invention.

FIG. 7 is a perspective view of a valve lid according to a first modification. FIG. 8 is a perspective view of a valve lid according to a second modification. FIG. 9 is a perspective view of a valve lid according to a third modification.

Like the valve lid 160 shown in FIG. 4, in a valve lid 360 shown in FIG. 7, an opposing surface 361 to the membrane valve 140 has a shape corresponding to the movable range of the membrane valve, that is, a mortar shape. Further, four groove portions 363 are provided at the opposing surface 361 along the diameter direction, and one groove portion 363 and a connection port 364*a* are disposed to cross each other.

Like the valve lid 160 shown in FIG. 4, in a valve lid 460 shown in FIG. 8, an opposing surface 461 to the membrane valve 140 has a shape corresponding to the movable range of the membrane valve, that is, a mortar shape. Further, a plurality of groove portions 463 are provided at the opposing surface 461, and an extension line of a center line of at least one groove portion 463 is disposed to a connection port 464*a*.

Like the valve lid 160 shown in FIG. 4, in a valve lid 560 shown in FIG. 9, an opposing surface 561 to the membrane valve 140 has a shape corresponding to the movable range of the membrane valve, that is, a mortar shape. Further, one groove portion 563 is provided at the opposing surface 561. Here, an extension line of a center line of the groove portion 563, not the groove portion 563, cross a connection port 564*a*.

Moreover, in the valid lids 160 and 260 in the first and second embodiments and the valid lids 360, 460, and 560 in the first to third modifications, the individual groove portions 163 to 563 are not necessarily in a linear shape. For example, the groove portions 163 to 563 may be in a ring shape.

Third Embodiment

Figure 10:
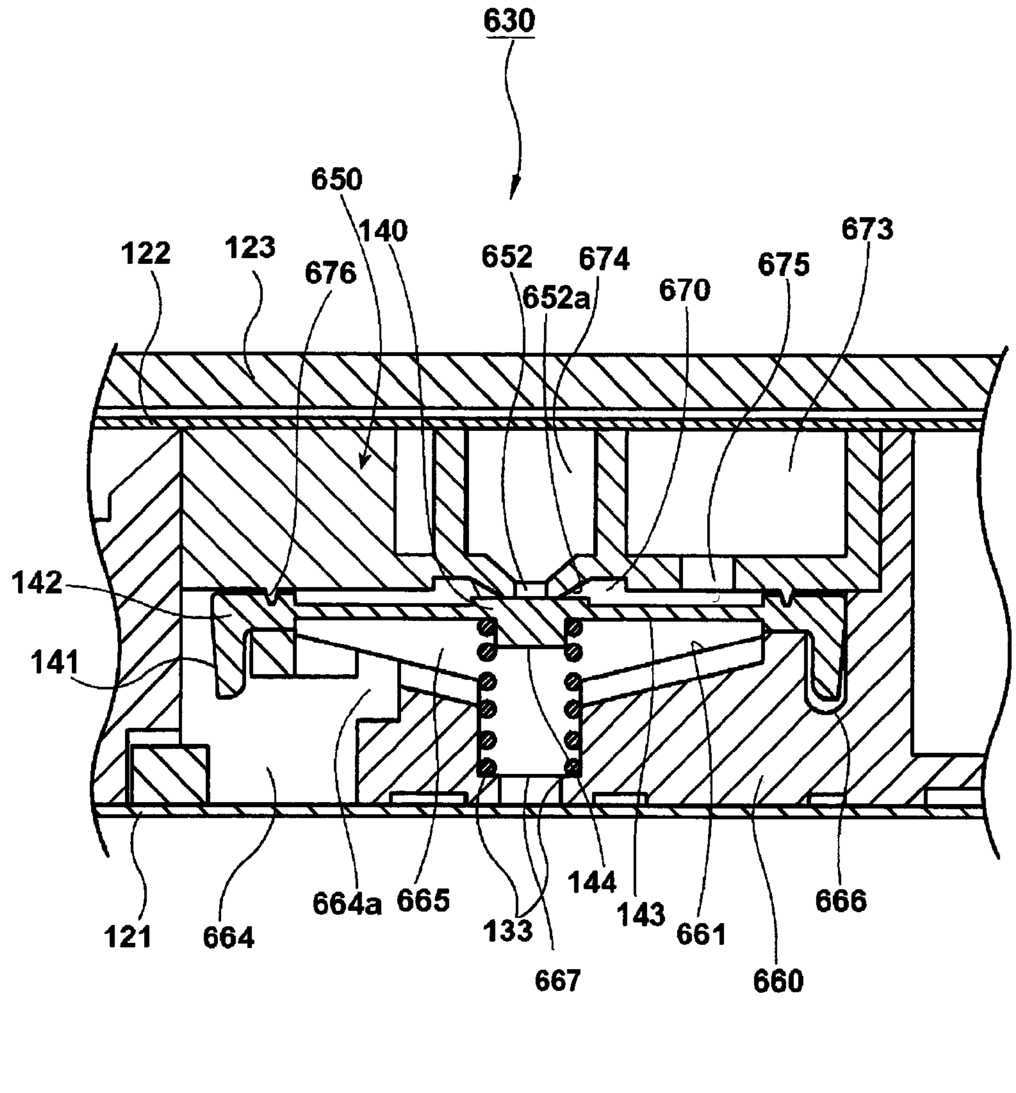
FIG. 10 is an enlarged cross-sectional view of a differential pressure valve unit according to a third embodiment of the invention.

FIG. 10 is an enlarged cross-sectional view of a differential pressure valve unit according to a third embodiment of the invention.

In this embodiment, the first member is provided in the differential pressure unit accommodating portion.

The same parts as those in the first embodiment are represented by the same reference numerals, and the descriptions thereof will be omitted.

As shown in FIG. 10, a differential pressure valve unit 630 has a differential pressure valve unit accommodating portion 660 having the same structure as the valve lid 160 in the first embodiment, the membrane valve 140 that is inserted into the differential pressure valve unit accommodating portion 660, a lid member 650 having the same structure as the differential pressure valve unit accommodating portion 150 in the first embodiment, and the coil spring 133 that serves as an urging member between the membrane valve 140 and the differential pressure valve unit accommodating portion 660.

Moreover, the membrane valve 140 is the same as that of the first embodiment, and the description thereof will be omitted.

A recess portion 666 that holds the edge portion 141 of the membrane valve 140 and a spring receiving portion 667 that holds the coil spring 133 are provided in the differential pressure valve unit accommodating portion 660.

An opposing surface 661 of the differential pressure valve unit accommodating portion 660 to the membrane valve 140 has a shape corresponding to the movable range of the membrane valve, that is, a mortar shape. Accordingly, even though the membrane valve 140 is deformed due to the pressure applied thereto, the interference with the first member does not occur.

A connection port 664*a* is provided at the opposing surface 661 so as to be connected to a connection portion 664. Since the spring receiving portion 667 is provided at the central portion of the opposing surface 661, the connection port 664*a* is provided at a position distant from the central portion. Like the valve lid 160 of the first embodiment, two groove portions are provided along the diameter direction of the opposing surface 661 in order to allow the liquid to easily flow into the connection port 664*a*. Further, one of the two groove portions is provided to cross the connection port 664*a*.

Moreover, the two groove portions may be the same as the groove portions in the first and second embodiments and the modifications.

The connection portion 664 is also connected to a downstream ink supply hole 674 that is disposed immediately on a downstream side of a through hole 652 of the lid member 650.

At an opposing surface of the lid member 650 to the membrane valve 140, a ring-shaped protrusion 676 protruding in a direction in which the membrane valve 140 is attached and having a wedge shape that is tapered in the direction in which the membrane valve 140 is attached is provided along an outer circumference surrounding the through holes 652 and 675.

Since the thick portion 142 of the membrane valve 140 is more flexible than the ring-shaped protrusion 676, if the lid member 650 and the membrane valve 140 are inserted into the differential pressure valve unit accommodating portion 660, the front end of the ring-shaped protrusion 676 is pressed into contact with and wedged into the thick portion 142 of the membrane valve 140. Then, an upstream pressure chamber 670 that is connected to the through hole 675 is formed.

A through hole portion 652*a* that protrudes toward the membrane valve 140 and comes into contact with the main body-side protruded portion 145 of the membrane valve 140 is provided in the vicinity of the through hole 652 of the lid member 650.

Accordingly, when ink is not supplied, the protruded portion 145 of the membrane valve 140 comes into contact with the through hole protruded portion 652*a*, thereby reliably blocking the through hole 652.

The upstream pressure chamber 670 is connected to an upstream ink tank 673 through the through hole 675, and ink is supplied from the upstream ink tank 673 to the differential pressure valve unit 630.

As described above, in this embodiment, the first member is provided in the differential pressure valve unit accommodating portion, and this embodiment has the same advantages as the first embodiment.

What is claimed is:

1. A differential pressure valve unit adapted to be accommodated in a liquid cartridge main body having: a liquid containing portion containing liquid; and a liquid supply portion supplying the liquid in the liquid containing portion to the outside, the differential pressure valve unit comprising:

a membrane valve having an elastically deformable part, and configured to be opened when a predetermined pressure difference between the liquid containing portion and the liquid supply portion occurs; and a first member holding the membrane valve and forming a downstream pressure chamber together with the membrane valve, the first member having a surface formed with a groove portion and opposing the elastically deformable part of the membrane valve; and formed in the first member, intersecting with the groove portion and communicating the downstream pressure chamber with the liquid supply portion.

2. The differential pressure valve unit according to claim 1, wherein the first member is substantially formed in a disc shape, and the groove portion is provided along a diameter direction of the opposing surface.

3. The differential pressure valve unit according to claim 1, wherein the groove portion is substantially provided in a linear shape.

4. The differential pressure valve unit according to claim 1, wherein the groove portion is substantially provided in an arc shape.

5. The differential pressure valve unit according to claim 1, wherein a plurality of groove portions are provided.

6. The differential pressure valve unit according to claim 1, wherein is the surface of the first member has a mortar shape having a deep central portion and a shallow peripheral portion.

7. The differential pressure valve unit according to claim 1, further comprising:

an urging member that is interposed between the membrane valve and the first member and urges the membrane valve in a direction in which the valve is closed.

8. The differential pressure valve unit according to claim 1, wherein the first member is a valve lid.

9. The differential pressure valve unit according to claim 1, wherein the liquid cartridge is an ink cartridge.

10. An ink cartridge, adapted to be mounted on an ink jet recording apparatus, comprising:

a first chamber;

a second chamber;

a passage communicating the first chamber and the second chamber;

a valve chamber, having a first opening communicating with the first chamber; and a differential pressure valve, including a membrane valve disposed in the valve chamber and having an elastically deformable part; and a lid, covering the valve chamber, and having a surface formed with at least one groove and opposing the elastically deformable part of the membrane valve, the lid having a second opening intersecting with the groove and communicating with the second chamber, wherein the membrane valve is configured to open the passage in accordance with pressure difference between the first chamber and the second chamber.

11. The ink cartridge according to claim 10, wherein:

the at least one groove includes a plurality of grooves; and the second opening intersects with one of the grooves.

12. The ink cartridge according to claim 10, further comprising:

a film, covering the lid.

13. The ink cartridge according to claim 10, wherein:

the membrane valve is circular and the groove extends along a radial direction of the membrane valve.

14. The ink cartridge according to claim 10, wherein:

the groove extends linearly.

15. A differential pressure valve that is accommodated in a liquid cartridge main body having: a liquid containing portion containing liquid; and a liquid supply portion supply the liquid in the liquid containing portion to the outside, the differential pressure valve unit comprising:

a membrane valve that is opened when a predetermined pressure difference between the liquid containing portion and the liquid supply portion occurs; and a first member that holds the membrane valve and forms a downstream pressure chamber together with the membrane valve; wherein:

in the first member, an opposing surface forming the downstream pressure chamber and having a connection port connected to the liquid supply portion has a shape corresponding to a movable range of the membrane valve, and a plurality of groove portions are provided at the opposing surface in order to allow the liquid in the downstream pressure chamber to easily flow into the connection port.

16. The differential pressure valve unit according to claim 15, wherein extension lines of the groove portions cross the connection port.

17. The differential pressure valve unit according to claim 15, wherein the groove portions cross the connection port.

* * * * *